US010139865B2

(12) United States Patent
Koriyama (10) Patent No.: US 10,139,865 B2
(45) Date of Patent: Nov. 27, 2018

(54) APPARATUS HOLDING STRUCTURE

(71) Applicant: NINTENDO CO., LTD., Kyoto (JP)

(72) Inventor: Kazuhiko Koriyama, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/859,878

(22) Filed: Jan. 2, 2018

(65) Prior Publication Data

US 2018/0196466 A1    Jul. 12, 2018

(30) Foreign Application Priority Data

Jan. 6, 2017   (JP) ................................. 2017-001087

(51) Int. Cl.
```
A47G 29/00      (2006.01)
G06F 1/16       (2006.01)
F16M 11/10      (2006.01)
F16M 13/00      (2006.01)
A63F 13/92      (2014.01)
A63F 13/98      (2014.01)
```
(52) U.S. Cl.
CPC .............. *G06F 1/166* (2013.01); *A63F 13/92* (2014.09); *A63F 13/98* (2014.09); *F16M 11/10* (2013.01); *F16M 13/005* (2013.01); *G06F 1/1626* (2013.01); *G06F 1/1681* (2013.01)

(58) Field of Classification Search
CPC ...... G06F 1/166; F16M 11/10; F16M 13/005; F16B 2001/0035
See application file for complete search history.

(56) References Cited

U.S. PATENT DOCUMENTS

| | | | |
|---|---|---|---|
| 7,566,043 B2 * | 7/2009 | Chen ..................... | G06F 1/1616 248/188.2 |
| 7,878,474 B1 | 2/2011 | Richer et al. | |
| 8,177,175 B2 * | 5/2012 | Chang .................... | F16M 11/10 248/168 |
| 9,671,830 B2 * | 6/2017 | Chen .................... | F16M 13/005 |

(Continued)

FOREIGN PATENT DOCUMENTS

| | | |
|---|---|---|
| EP | 2 446 946 | 5/2012 |
| JP | 2008-227180 A | 9/2008 |

(Continued)

OTHER PUBLICATIONS

May 10, 2018 Notice of Reasons for Refusal issued in Japanese Patent Application No. 2017-001087.

(Continued)

*Primary Examiner* — Amy J. Sterling
(74) *Attorney, Agent, or Firm* — Nixon & Vanderhye P.C.

(57) ABSTRACT

A holding structure according to an exemplary embodiment includes a rotation axis, a stand body, and a clicker. The stand body is rotatable about the rotation axis. When the stand body is rotated about the rotation axis, an upper end portion of the stand body contacts with the clicker. When the stand body is further rotated from a position at which the stand body and the clicker contacts with each other, the stand body rotates beyond the clicker. Thus, the stand body enters an opened state and holds an orientation of an apparatus. When the upper end portion of the stand body rotates beyond the clicker, the clicker is restored from a deformed state to an initial state, and a clicking sound occurs.

29 Claims, 7 Drawing Sheets

(56) References Cited

U.S. PATENT DOCUMENTS

| | | | |
|---|---|---|---|
| 2009/0302175 A1 | 12/2009 | Torii et al. | |
| 2010/0309617 A1 | 12/2010 | Wang et al. | |
| 2012/0069504 A1 | 3/2012 | Ho et al. | |
| 2014/0174960 A1 | 6/2014 | Zhu | |
| 2015/0022961 A1 | 1/2015 | Jenkins et al. | |

FOREIGN PATENT DOCUMENTS

| | | |
|---|---|---|
| JP | 2012-232025 | 11/2012 |
| KR | 10-2008-0037399 A | 4/2008 |

OTHER PUBLICATIONS

Jun. 6, 2018 Extended European Search Report issued in European Application No. 18150248.5.
Oct. 9, 2018 Decision of Refusal issued in Japanese Application No. 2017-001087.

\* cited by examiner

FIG. 12

APPARATUS HOLDING STRUCTURE

CROSS REFERENCE TO RELATED APPLICATION

The disclosure of Japanese Patent Application No. 2017-1087, filed on Jan. 6, 2017, is incorporated herein by reference.

FIELD

The technique shown here relates to a holding structure for holding an orientation of an apparatus

BACKGROUND AND SUMMARY

To date, a technique for holding an orientation of a substantially plate-shaped information processing apparatus having a display unit, by using a stand other than the apparatus, has been known.

The structure for holding an orientation of an apparatus is required to be used by users with enhanced convenience.

Therefore, an object of the present technique is to provide a holding structure that is capable of holding an orientation of an apparatus and is conveniently used.

In order to achieve the above-described object, the present technique has the following features.

A holding structure according to the embodiment is a holding structure that holds, when an apparatus is placed on a placement surface, an orientation of the apparatus. The holding structure includes: an axis portion; a body portion configured to be rotatable about the axis portion and to hold an orientation of the apparatus; and a stopping portion. The body portion is rotatable about the axis portion from a first position to a second position, and a part of the body portion contacts with the stopping portion at an intermediate rotational position during rotation of the body portion from the first position to the second position. The stopping portion stops rotation of the body portion in at least one direction.

In the above-described configuration, during rotation of the body portion for holding an orientation of the apparatus, a part of the body portion contacts with the stopping portion, and the rotation of the body portion is stopped by the stopping portion. Thus, unintended rotation of the body portion can be prevented, and an orientation of the apparatus can be stably held, whereby the holding structure can be used with enhanced convenience.

Furthermore, the axis portion may be disposed at an upper portion of the body portion. The body portion may include a support portion that extends from the axis portion to a lower end of the body portion and supports the apparatus, and a projection portion that projects from an upper end of the support portion and contacts with the stopping portion when the body portion rotates about the axis portion.

In the above-described configuration, rotation of the body portion can be stopped by the projection portion that extends in the upper end direction.

Furthermore, an angled portion may be provided at an end portion of the projection portion.

In the above-described configuration, since the angled portion is provided at the end portion of the projection portion, even when the body portion contacts with the stopping portion, the body portion can be easily rotated beyond the stopping portion.

Furthermore, a lower end portion of the body portion may contact with the placement surface when the apparatus is placed on the placement surface, and an angled portion may be provided at an upper end portion, opposite to the lower end portion, of the body portion.

In the above-described configuration, since the angled portion is provided at the upper end portion of the body portion, even when the body portion contacts with the stopping portion, the body portion can be easily rotated beyond the stopping portion.

Furthermore, an angled surface of the angled portion may be oriented toward the apparatus.

In the above-described configuration, since the surface of the angled portion is oriented toward the apparatus, in a case where the body portion contacts with the stopping portion when, for example, the body portion rotates from the first position to the second position, the body portion can be easily rotated.

Furthermore, an upper end portion of the body portion and a lower end portion of the stopping portion may be configured to contact with each other. The upper end portion of the body portion may move toward the apparatus when the body portion is rotated from the first position to the second position. The stopping portion may be bent or curved toward the apparatus at least at the lower end portion of the stopping portion.

In the above-described configuration, since the lower end portion of the stopping portion is bent toward the apparatus, a position at which the body portion and the stopping portion contact with each other can be closer to the apparatus, and the body portion can be stopped at a position closer to the apparatus.

Furthermore, a stopper portion may be provided at a lower end portion of the body portion. The stopper portion may be configured to contact with the placement surface when the body portion is rotated to the second position and the apparatus is placed on the placement surface, and the stopper portion may be formed from a material having a friction coefficient greater than the lower end portion of the body portion.

In the above-described configuration, since the stopper portion is provided at the lower end portion, of the body portion, with which the placement surface contacts, the body portion can be prevented from slipping relative to the placement surface.

Furthermore, the body portion may be in a closed state when the body portion is at the first position. The body portion may be in an opened state when the body portion is at the second position. The body portion may hold an orientation of the apparatus with respect to the placement surface when the body portion is rotated about the axis portion into the opened state. A rear surface of the body portion may be almost level with a rear surface of a housing of the apparatus when the body portion is in the closed state.

In the above-described configuration, the body portion is almost level with the rear surface of the housing of the apparatus when the body portion is in the closed state. In other words, when the body portion is in the closed state, the height of the body portion and the height of the rear surface, other than the body portion, of the housing of the apparatus are almost level with each other in the direction perpendicular to the rear surface of the housing, and a stepped portion is not formed in a boundary between the body portion and a portion, of the housing, other than the body portion.

Furthermore, the body portion may be in a closed state when the body portion is at the first position. The body portion may be in an opened state when the body portion is at the second position. The body portion may form a part of an outer surface of a housing of the apparatus when the body portion is in the closed state. A width, in a lateral direction, of the body portion may be less than a width, in the lateral direction, of the housing of the apparatus.

In the above-described configuration, by the body portion that is a part of the outer surface of the housing of the apparatus being rotated, an orientation of the apparatus can be held.

Furthermore, the axis portion may be a metal member.

In the above-described configuration, even when the body portion is repeatedly rotated, the axis portion can be prevented from being worn.

Furthermore, a lower end portion of the body portion may be configured to contact with the placement surface when the apparatus is placed on the placement surface. The lower end portion of the body portion may be bent or curved toward the apparatus.

In the above-described configuration, since the lower end portion of the body portion is bent or curved, the lower end portion of the body portion can be brought into contact with the placement surface at an angle closer to an angle perpendicular to the placement surface, whereby the body portion can be prevented from slipping relative to the placement surface.

Furthermore, a holder configured to engage with the stopping portion such that the holder and the stopping portion can separate from each other, may be provided. The stopping portion may be engaged with the holder and fixed to the apparatus.

In the above-described configuration, even when, for example, the stopping portion is worn due to repeated contact with the body portion, the stopping portion can be changed.

Furthermore, the holding structure may be provided in the apparatus.

In the above-described configuration, since the holding structure is provided in the rear surface of the apparatus, the orientation of the apparatus can be held without using a supporting device other than the apparatus.

Furthermore, the body portion may be in a closed state when the body portion is at the first position. The body portion may be in an opened state when the body portion is at the second position. The body portion may be configured to hold an orientation of the apparatus with respect to the placement surface when the body portion is in the opened state. At least one projection that is configured to engage with an engagement portion provided in the apparatus when the body portion is in the closed state may be provided on a rear side of the body portion.

In the above-described configuration, the body portion can be caused to engage with the apparatus when the body portion is in the closed state, and the closed state can be maintained.

Furthermore, an axis support configured to support the axis portion such that the axis portion is rotatable, may be provided, the axis portion may be fixed to the body portion, and a diameter of the axis support may be less than a diameter of the axis portion.

In the above-described configuration, since the diameter of the axis support is less than the diameter of the axis portion, when the body portion is rotated with a high force, the axis portion and the body portion are relatively easily detached from the axis support. Therefore, the holding structure and the apparatus can be prevented from being damaged.

Another embodiment is an apparatus including a holding structure for holding an orientation of the apparatus when the apparatus is placed on a placement surface. The apparatus includes: an axis portion; a body portion configured to be rotatable about the axis portion and to hold an orientation of the apparatus; and a stopping portion. The body portion is rotatable about the axis portion from a first position to a second position, and a part of the body portion contacts with the stopping portion at an intermediate rotational position during rotation of the body portion from the first position to the second position. The stopping portion stops rotation of the body portion in at least one direction.

Another embodiment is a holding structure that is configured to support an apparatus that is placed on a placement surface in a predetermined orientation. The holding structure includes a body and a hinge. The body includes a retaining structure adjacent a first end, the retaining structure including: a first central portion that is straight except adjacent a screw hole that is laterally centered on the first central portion; two first lateral straight portions that are at opposed ends of and perpendicular to the first central portion and extending away from the first central portion towards the first end, and two first curved portions that connect the two first lateral straight portions to the first central portion. The hinge structure includes: a second central portion that is straight; two second lateral straight portions that are at opposed ends of the second central portion and that are perpendicular to the second central portion and that extend away from the second central portion towards the first end; two second curved portions that connect the two second lateral straight portions to the second central portion; and a first projection and a second projection extending from respective ones of the two second lateral straight portions and extending along an axis that is parallel to the second central portion, the first projection and the second projection projecting outward from the hinge structure in opposite directions, in which the retaining structure and the hinge structure are each substantially U-shaped and the retaining structure is nested within the hinge structure.

Furthermore, a screw with a head is further provided, and the screw is retained in the screw hole, the head retains the hinge portion by covering part of the second central portion of the hinge portion, and a center of the head is on an opposite side of the first central portion from the second central portion.

Furthermore, the body further includes a second end opposite the first end, the second end is curved and includes two projections projecting from a radially interior side of the curve, and the projections are configured to be received in respective recesses of the apparatus to retain the holding structure against the apparatus in a closed state.

Furthermore, the first end includes a surface that is angled with respect to an overall length of the holding structure such that when the holding structure is rotated from a first position to a second position about the axis, the surface has an orientation in the second position that is orientated toward the apparatus.

Still another embodiment is a holding structure that holds, when an apparatus is placed on a placement surface, an orientation of the apparatus. The holding structure includes an axis portion and a body portion. The body portion is configured to be rotatable about the axis portion and to hold an orientation of the apparatus. The body portion is rotatable about the axis portion from a first position to a second position. A part of the body portion is configured to contact with a stopping portion of the apparatus at a position during rotation of the body portion from the first position to the second position, the stopping portion being configured to stop rotation of the body portion in at least one direction.

According to the embodiment, the holding structure that holds an orientation of the apparatus can be used with enhanced convenience.

These and other objects, features, aspects and advantages of the exemplary embodiment will become more apparent from the following detailed description when taken in conjunction with the accompanying drawings.

BRIEF DESCRIPTION OF THE DRAWINGS

FIGS. 12(a)-12(d) are an example non-limiting diagram illustrating a positional relationship between a stand body 11 and a clicker 16 in the case of the stand body 11 being rotated.

DETAILED DESCRIPTION OF NON-LIMITING EXAMPLE EMBODIMENTS

Figure 1:
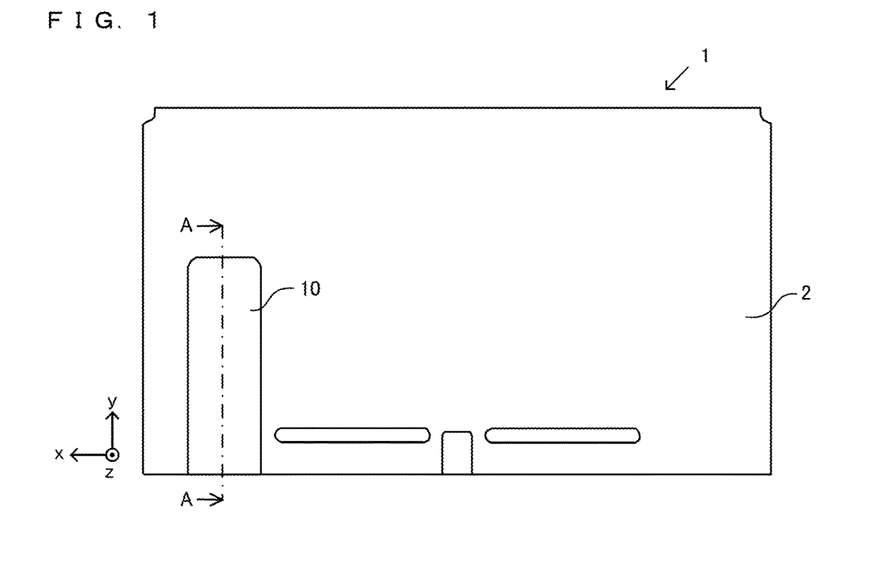
FIG. 1 is an example non-limiting rear view of an information processing apparatus according to an embodiment.
Figure 2:
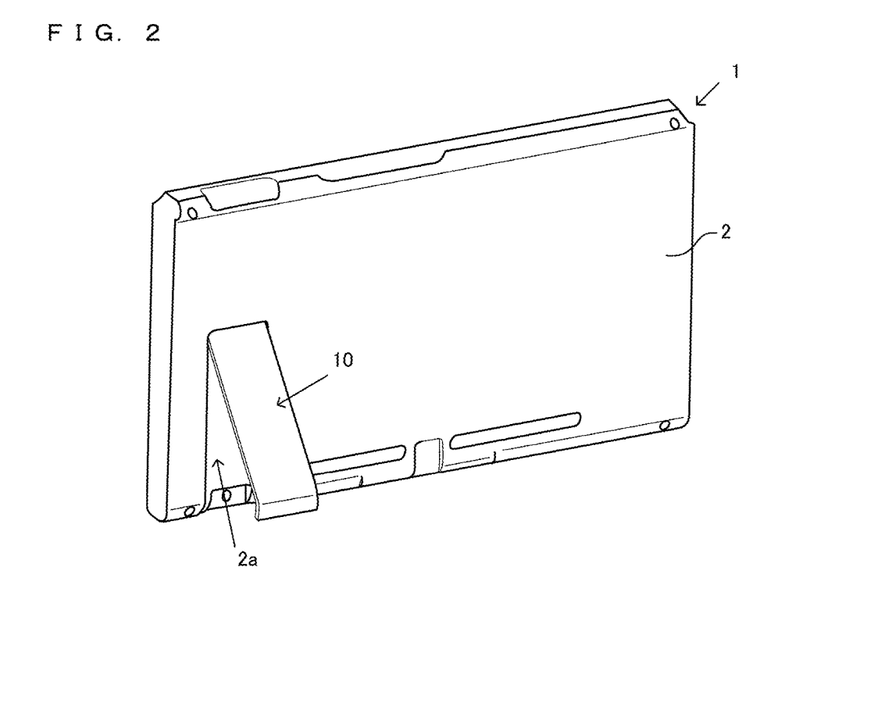
FIG. 2 is an example non-limiting perspective rear view of an information processing apparatus 1 in a state where an orientation of the information processing apparatus 1 is held by using a stand 10.

A holding structure for holding an orientation of an information processing apparatus according to an example of the present embodiment will be described below. FIG. 1 is an example non-limiting rear view of an information processing apparatus according to the present embodiment. FIG. 2 is an example non-limiting perspective rear view of an information processing apparatus 1 in a state where an orientation of the information processing apparatus 1 is held by using a stand 10.

The information processing apparatus 1 is substantially thin-plate-shaped and has a laterally elongated shape. The information processing apparatus 1 allows applications (for example, game applications, applications for performing other information processing, and the like) to be executed, and may be, for example, a game apparatus, a tablet terminal, or a smartphone. The information processing apparatus 1 is, for example, a hand-held apparatus, and may have such a size that can be held by a user with both hands or one hand of the user. On the front surface of the information processing apparatus 1, a screen of a display unit (not shown) is provided. Furthermore, a battery may be provided in a housing 2 of the information processing apparatus 1.

As shown in FIG. 1, the stand 10 is provided in the rear surface of the information processing apparatus 1. The stand 10 has a length that is shorter in the up-down direction (y-axis direction in FIG. 1) than the rear surface of the information processing apparatus 1, and also shorter in the left-right direction (x-axis direction in FIG. 1) than the rear surface of the information processing apparatus 1. For example, the stand 10 is provided leftward of the center in the left-right direction in the case of the information processing apparatus 1 being viewed from its rear surface.

In a state where the stand 10 is closed, the stand 10 forms a part of the rear surface of the information processing apparatus 1. Specifically, as shown in FIG. 2, a storage portion 2a having almost the same size as the stand 10 is formed in a lower left region of the rear surface of the housing 2 of the information processing apparatus 1. In a state where the stand 10 is closed, the stand 10 is stored in the storage portion 2a. The depth (height in the z-axis direction) of the storage portion 2a of the housing 2 is almost equal to the thickness (thickness in the z-axis direction) of the stand 10. In a state where the stand 10 is closed, the height of the stand 10 is almost level with the height of a rear surface portion, of the housing 2, other than the stand 10 (in the z-axis direction). That is, in a state where the stand 10 is closed, the rear surface of the housing 2 including the stand 10 is almost flat, and a stepped portion is not substantially formed in a boundary portion between the stand 10 and the rear surface, of the housing 2, other than the stand 10.

Meanwhile, in a state where the stand 10 is opened, the stand 10 projects in the rear surface direction, and, by the stand 10 that projects in this manner, the orientation of the information processing apparatus 1 is held, as shown in FIG. 2.

Figure 3:
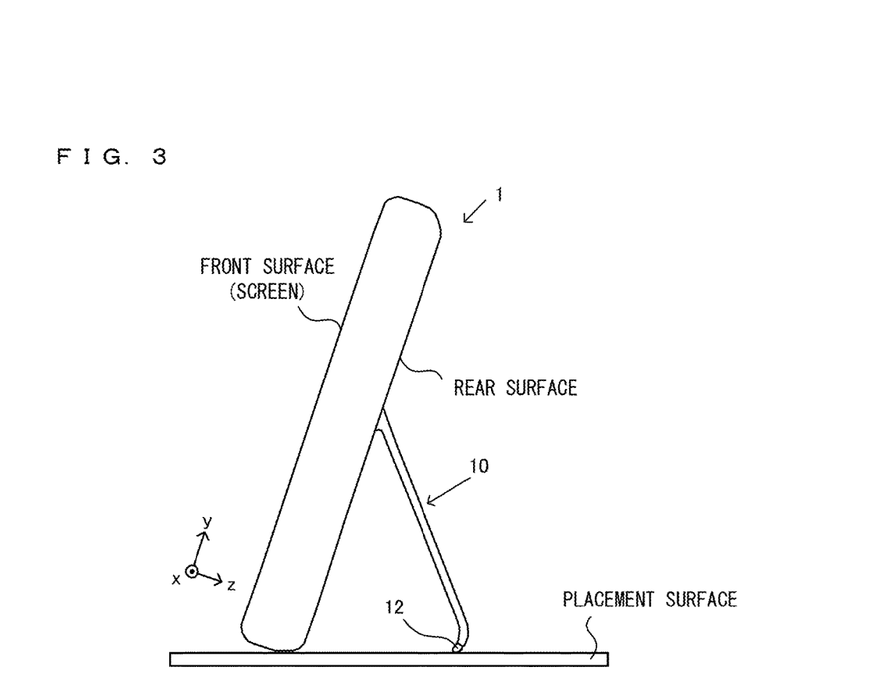
FIG. 3 is an example non-limiting diagram illustrating an example of a state where the information processing apparatus 1 is placed on a placement surface and the orientation of the information processing apparatus 1 is held by the stand 10.

FIG. 3 is an example non-limiting diagram illustrating an example of a state where the information processing apparatus 1 is placed on a placement surface and the orientation of the information processing apparatus 1 is held by the stand 10. As shown in FIG. 3, in a case where the stand 10 provided in the rear surface of the information processing apparatus 1 is opened and is placed on a placement surface such as a table, the front surface (screen of the display unit) of the information processing apparatus 1 is oriented diagonally upward so as to form a predetermined angle relative to the placement surface. As shown in FIG. 3, a stopper member 12 is provided as an anti-slip member in a lower end portion of the stand 10. Toward the lower end of the stand 10, the stand 10 is curved toward the information processing apparatus 1 so as to have an almost arc shape toward the information processing apparatus 1. That is, the lower end portion of the stand 10 is round-shaped. As shown in FIG. 3, a boundary portion between the bottom surface and the rear surface of the information processing apparatus 1 is round-shaped. In a state where the stand 10 is closed, the round-shaped portion at the lower end portion of the stand 10 forms a part of the round-shaped portion at the boundary portion between the bottom surface and the rear surface of the information processing apparatus 1. Thus, when the stand 10 is closed, the boundary portion between the bottom surface and the rear surface of the information processing apparatus 1 is round-shaped almost over the entirety, in the left-right direction (direction perpendicular to the drawing sheet in FIG. 3), of the information processing apparatus 1.

Figure 4:
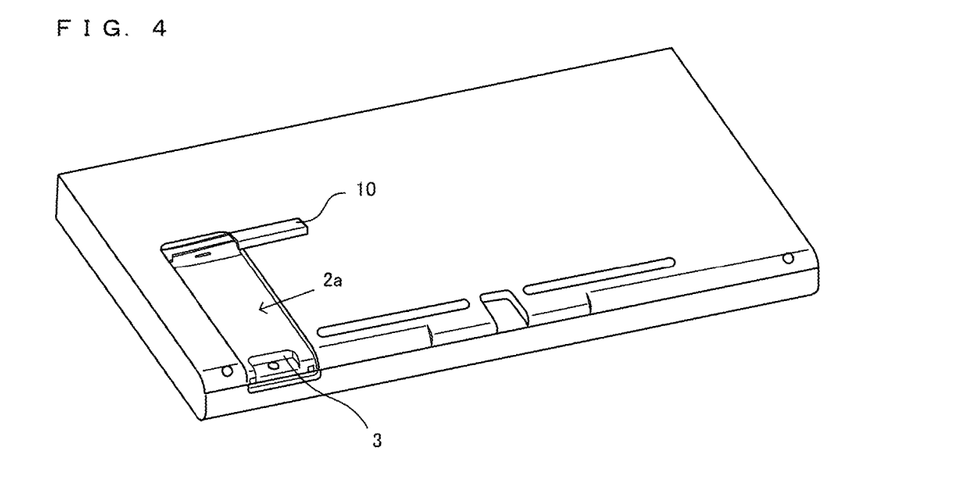
FIG. 4 is an example non-limiting view of the information processing apparatus 1 in a state where the stand 10 is opened, as viewed from the rear surface.
Figure 5:
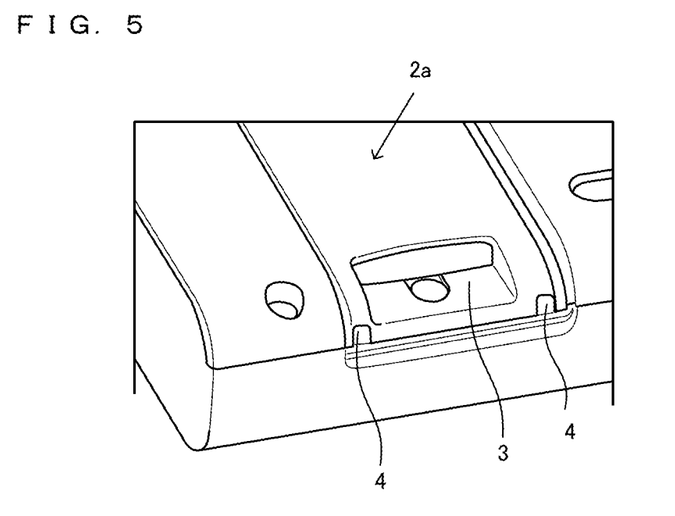
FIG. 5 is an example non-limiting partially enlarged view of a storage portion 2a in the rear surface of the information processing apparatus 1.

FIG. 4 is an example non-limiting view of the information processing apparatus 1 in a state where the stand 10 is opened, as viewed from the rear surface. FIG. 5 is an example non-limiting partially enlarged view of the storage portion 2a in the rear surface of the information processing apparatus 1.

As shown in FIG. 4, a card slot 3 into which a memory card (for example, micro SD card) is inserted is formed in the storage portion 2a in the rear surface of the information processing apparatus 1. The stand 10 is used also as a cover for the card slot 3. That is, the stand 10 functions to cause the information processing apparatus 1 to stand and hold the orientation of the information processing apparatus 1 in a state where the stand 10 is opened, and functions as a cover for the card slot 3 in a state where the stand 10 is closed.

As shown in FIG. 5, a pair of recesses 4 are formed in the storage portion 2a in the rear surface of the information processing apparatus 1. The recesses 4 serve as an engagement portion (engaged portion) that engages with projections 13 (see FIG. 7) of the stand 10. The stand 10 is maintained in the closed state by the recesses 4 of the information processing apparatus 1 and the projections 13 of the stand 10 being engaged with each other.

Figure 6:
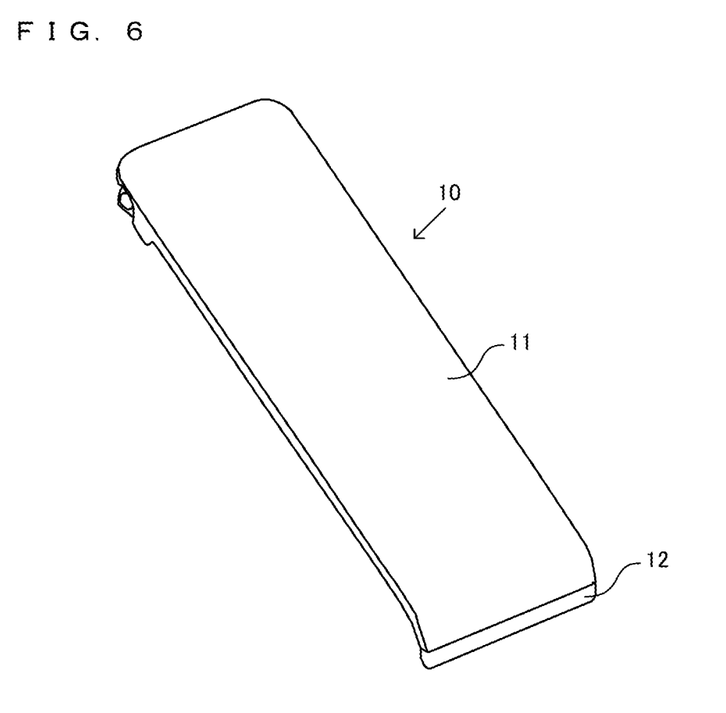
FIG. 6 is an example non-limiting perspective view of the stand 10 as viewed from the front surface.
Figure 7:
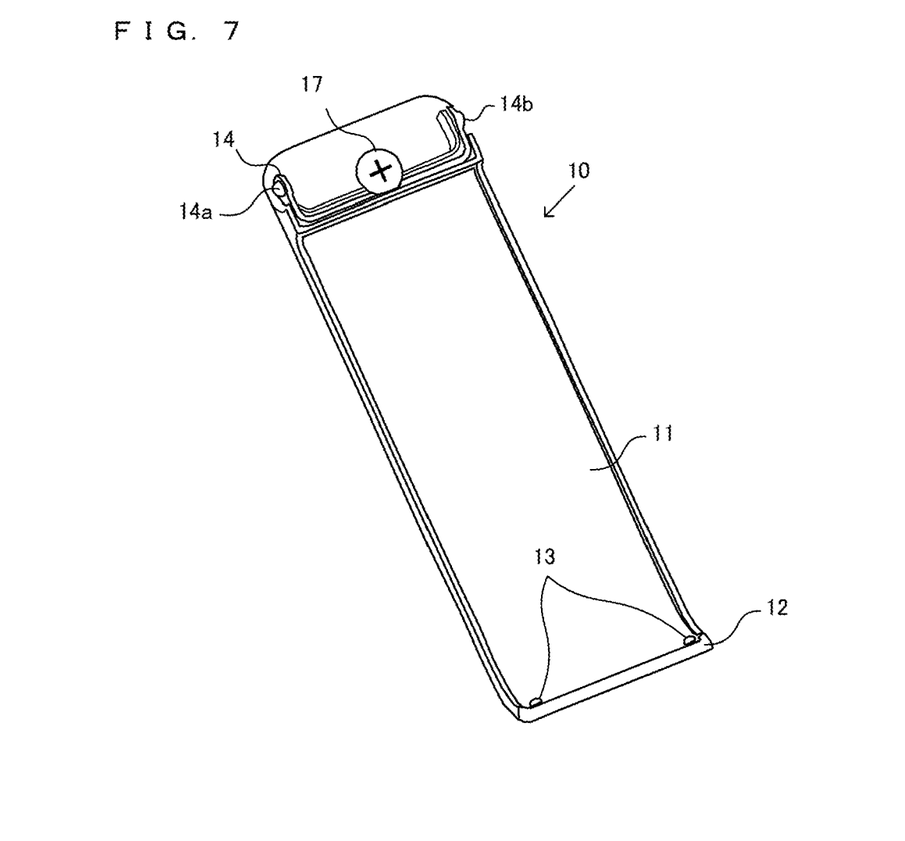
FIG. 7 is an example non-limiting perspective view of the stand 10 as viewed from the rear surface.
Figure 8:
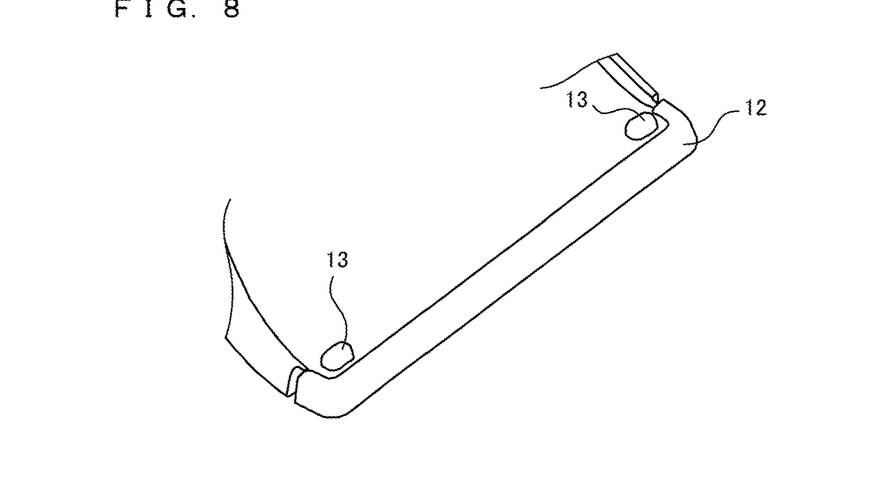
FIG. 8 is an example non-limiting partially enlarged view of the rear surface side of a lower end portion of the stand 10.
Figure 9:
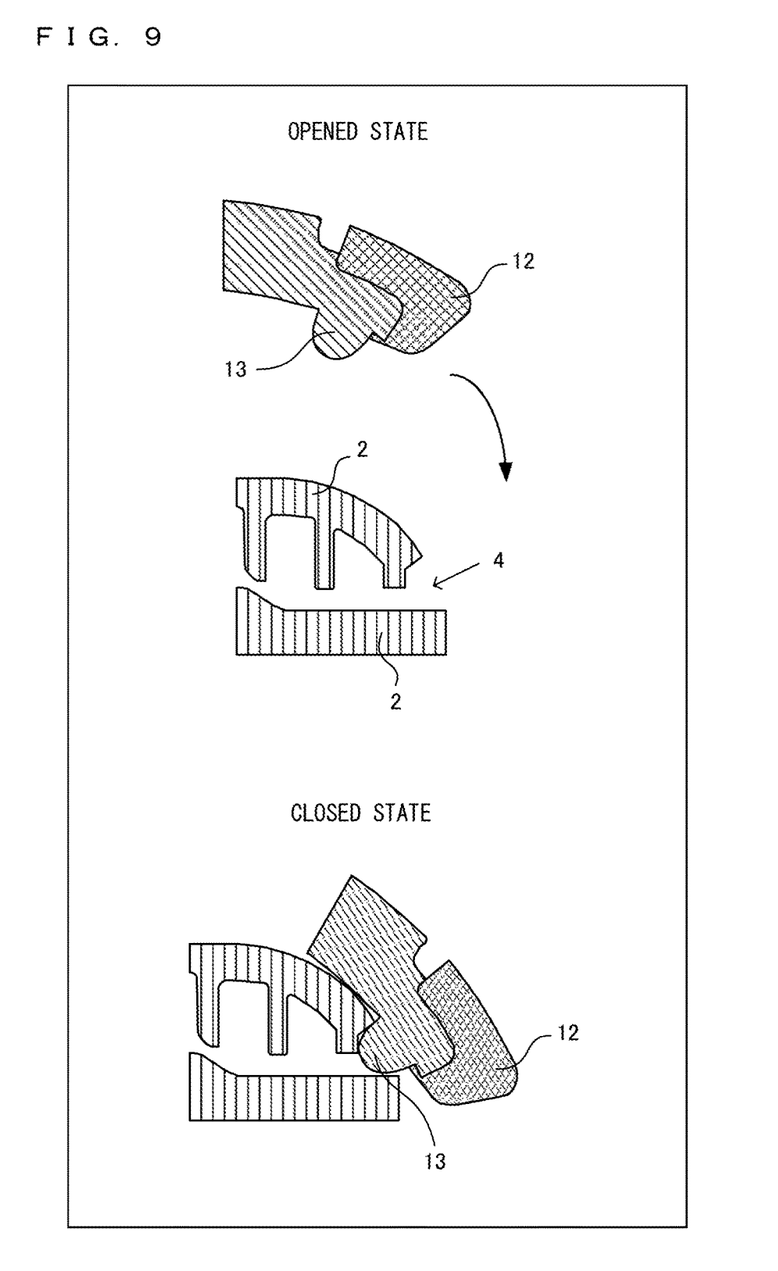
FIG. 9 is an example non-limiting partially enlarged view of the lower end portion of the stand 10 and a housing 2 of the information processing apparatus 1, illustrating a state where the stand 10 shifts from an opened state to a closed state.

FIG. 6 is an example non-limiting perspective view of the stand 10 as viewed from the front surface. FIG. 7 is an example non-limiting perspective view of the stand 10 as viewed from the rear surface. FIG. 8 is an example non-limiting partially enlarged view of the rear surface side of the lower end portion of the stand 10. FIG. 9 is an example non-limiting partially enlarged view of the lower end portion of the stand 10 and the housing 2 of the information processing apparatus 1, illustrating a state where the stand 10 shifts from an opened state to a closed state.

As shown in FIG. 6 to FIG. 8, the stand 10 includes a stand body 11, and the stopper member 12 provided at the lower end portion of the stand body 11. Furthermore, the pair of projections 13 are provided on the rear surface side of the lower end portion of the stand body 11. Moreover, a hinge portion 14 is provided on the rear surface side of the upper end portion of the stand body 11.

The stand body 11 is an almost rectangular thin-plate-shaped member. The lower end portion of the stand body 11 is curved in the rear surface direction (front surface direction of the information processing apparatus 1) of the stand body 11. The stand body 11 is formed from, for example, a synthetic resin such as plastic. The housing 2 of the information processing apparatus 1 is also formed from a resin. The projections 13 are formed so as to be integrated with the stand body 11. The projections 13 are engagement portions that engage with the recesses 4 of the housing 2 when the stand 10 is closed. As shown in FIG. 9, when the stand 10 is in a closed state, the projections 13 engage with the recesses 4 of the housing 2, to maintain the stand 10 in the closed state.

Furthermore, the stopper member 12 is formed from a member having a friction coefficient greater than the stand body 11, and is formed from, for example, silicone rubber. Specifically, LIMS molding is performed using liquid silicone rubber, whereby the stopper member 12 made of silicone rubber is formed so as to be in close contact with the lower end portion of the stand body 11.

The hinge portion 14 is formed from a metal (for example, iron or aluminium). The hinge portion 14 is a member that allows the entirety of the stand 10 to rotate. The hinge portion 14 is fixed to the stand body 11 by means of a screw 17. The hinge portion 14 and a structure for supporting the hinge portion 14 such that the hinge portion 14 is rotatable will be described below.

Next, the upper end portion of the stand 10 will be described in detail.

Figure 10:
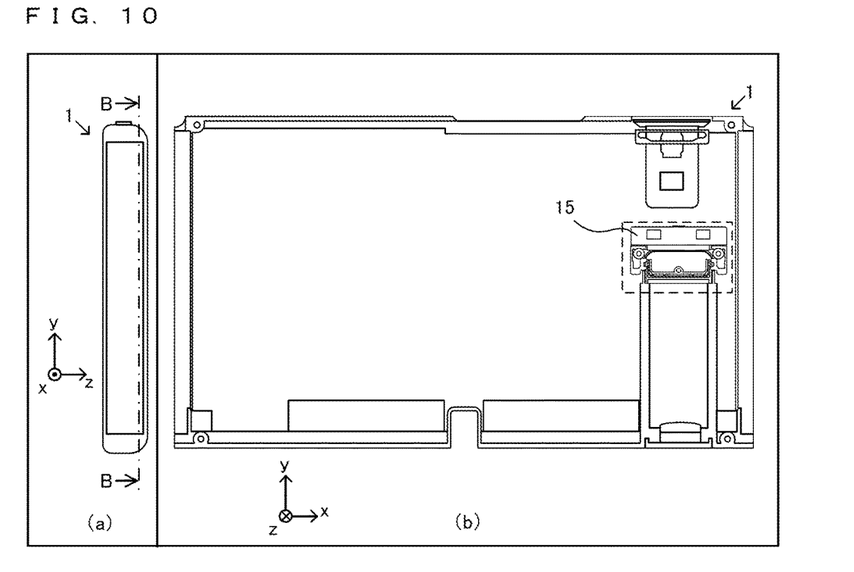
FIG. 10 is an example non-limiting view of a cross-section of the information processing apparatus 1.

FIG. 10 is an example non-limiting view of a cross-section of the information processing apparatus 1. FIG. 10(a) is a right side view of the information processing apparatus 1. FIG. 10(b) is a cross-sectional view taken along the line B-B in FIG. 10(a). Furthermore, FIG. 11 is an example non-limiting enlarged view of a dashed line portion in FIG. 10(b).

Figure 11:
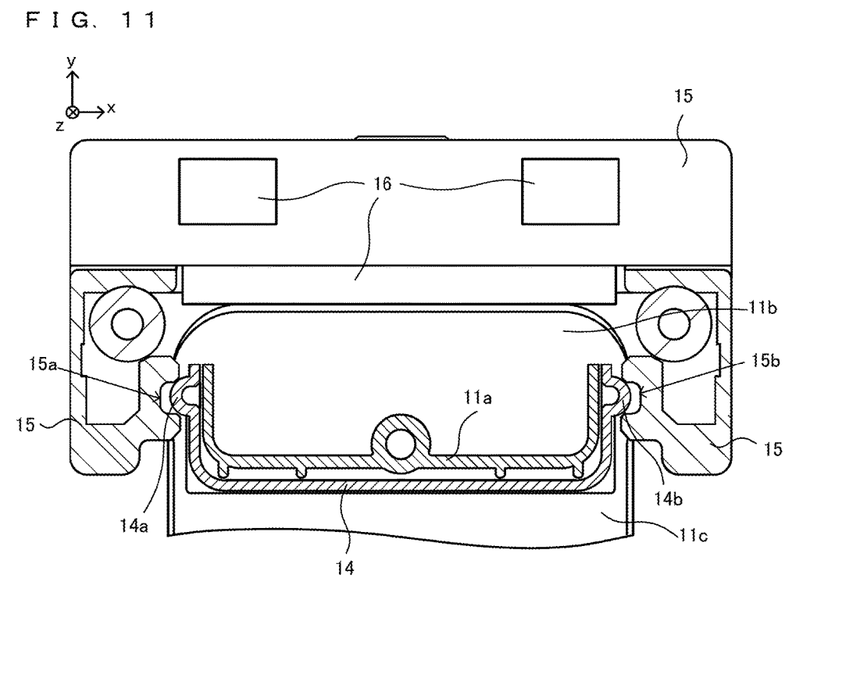
FIG. 11 is an example non-limiting enlarged view of a dashed-line portion shown in FIG. 10(b)

As shown in FIG. 10 and FIG. 11, a stand holder 15 is fixed, by means of a screw, to the housing 2 on the rear surface side of the information processing apparatus 1. The stand holder 15 is a member for fixing the stand 10 to the information processing apparatus 1. The stand holder 15 is formed from, for example, a resin such as plastic. The stand holder 15 may be formed from, for example, a material (material having a high strength) harder than the stand body 11 and the housing 2 of the information processing apparatus 1.

As shown in FIG. 11, in the stand holder 15, a clicker 16 (stopping portion) is fixed to the information processing apparatus 1. As shown in FIG. 11, the stand holder 15 has two openings, and a part of the clicker 16 engages with the openings. The stand holder 15 and the clicker 16 are formed from different members, respectively, so as to be separable from each other. The clicker 16 is formed from a material softer than the housing 2 and the stand holder 15, and is formed from, for example, an elastomer (for example, TPE: thermoplastic elastomer).

The hinge portion 14 is positioned by a portion 11a of the stand body 11, and is retained by the screw 17, whereby the hinge portion 14 is fixed to the stand body 11.

The stand holder 15 supports the hinge portion 14 such that the hinge portion 14 is rotatable. Specifically, the stand holder 15 has a pair of axis supports 15a, 15b that oppose each other. The hinge portion 14 has a pair of hemispherical projections 14a, 14b that project in the left-right direction. The projection 14a of the hinge portion 14 engages with the axis support 15a of the stand holder 15 and the projection 14b of the hinge portion 14 engages with the axis support 15b of the stand holder 15. Thus, the stand holder 15 supports the hinge portion 14 and the stand body 11 such that the hinge portion 14 and the stand body 11 are rotatable about an axis that extends between the projection 14a and the projection 14b.

More specifically, as shown in FIG. 11, the inner diameters of the axis supports 15a, 15b of the stand holder 15 are less than the outer diameters of the projections 14a, 14b of the hinge portion 14. Therefore, the projection 14a of the hinge portion 14 is not completely covered by the axis support 15a of the stand holder 15. That is, a part of the projection 14a is fitted into the axis support 15a. The same is applied to the axis support 15b and the projection 14b.

By the stand holder 15 and the hinge portion 14 being thus structured, the stand body 11 that includes the hinge portion 14 is supported so as to be rotatable about an axis that extends between the projection 14a and the projection 14b of the hinge portion 14. A portion, of the stand body 11, below the straight line that connects between the projections 14a and 14b of the hinge portion 14 is a support portion 11c that supports the information processing apparatus 1. A portion, of the stand body 11, above the straight line is a projection portion 11b. In this case, when the stand body 11 rotates, the upper end portion of the projection portion 11b of the stand body 11 contacts with the clicker 16. The movement of the stand body 11 in the case of the stand body 11 being rotated will be described below.

Figure 12:
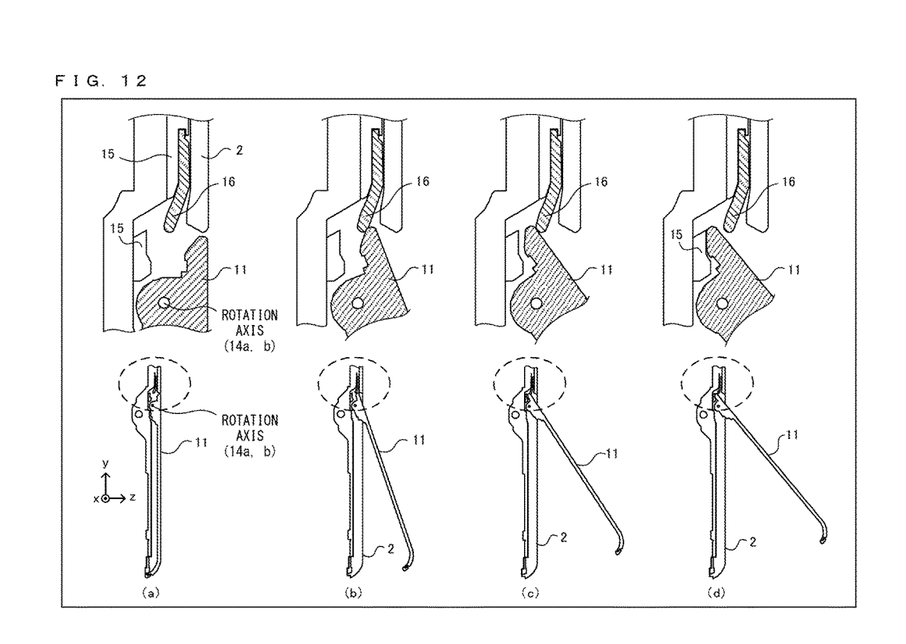

FIG. 12 is an example non-limiting diagram illustrating a positional relationship between the stand body 11 and the clicker 16 in the case of the stand body 11 being rotated. In the lower views of FIG. 12, a state where the stand body 11 gradually shifts from the closed state (first position) to the opened state (second position), is shown. The upper views of FIG. 12 represent enlarged views of the dashed line portions in the lower views. In FIG. 12, a cross-sectional view taken along the line A-A in FIG. 1 is shown, and portions necessary for describing a positional relationship between the stand body 11 and the clicker 16 are indicated, and the other portions are simplified.

As shown in FIG. 12, the stand body 11 rotates about the straight line, serving as the rotation axis, which extends between the projections 14a and 14b of the hinge portion 14. When the stand body 11 is rotated counterclockwise by a predetermined angle (angle less than an angle in a state shown in FIG. 12(d)) in a state where the stand body 11 is in the closed state (FIG. 12(a)), the upper end portion (the projection portion lib, also referred to as the end portion) of the stand body 11 contacts with the clicker 16 as shown in FIG. 12(b). As shown in FIG. 12, the clicker 16 has its lower end portion bent or curved toward the information processing apparatus 1 (in the front surface direction of the information processing apparatus 1: the z-axis negative direction). Since the lower end portion of the clicker 16 is bent or curved in the z-axis negative direction, a position at which the clicker 16 and the upper end portion of the stand body 11 contact with each other, is leftward, in FIG. 12, of a position at which the clicker 16 and the upper end portion of the stand body 11 contact with each other in a case where the clicker 16 is not bent or curved. That is, since the clicker 16 is bent or curved, the stand body 11 needs to be rotated more greatly as compared to a case where the clicker 16 is not bent or curved, in order to bring the upper end portion of the stand body 11 into contact with the clicker 16.

When the stand body 11 is further rotated counterclockwise in the state shown in FIG. 12(b), the clicker 16 is elastically deformed by being pressed in the z-axis negative direction by the upper end portion of the stand body 11. When the stand body 11 is further rotated, the upper end portion of the stand body 11 rotates beyond the lower end portion of the clicker 16 to move in the front surface direction (z-axis negative direction) of the information processing apparatus 1, and the state is as shown in FIG. 12(c). At this time, the clicker 16 is restored from the deformed state to an initial state, and clicking sound occurs.

When the stand body 11 is further rotated in the state shown in FIG. 12(c), the upper end portion of the stand body 11 contacts with a part of the stand holder 15 as shown in FIG. 12(d). Specifically, the upper end portion of the stand body 11 has an angled portion that is diagonally angled when the stand body 11 is closed. The surface of the angled portion is oriented toward the information processing apparatus 1 and the surface of the angled portion contacts with a part of the stand holder 15. In a state shown in FIG. 12(d), the stand body 11 does not further rotate. In the description herein, a state where the stand body 11 is opened to the maximum, is referred to as the maximum opened state (that is, the opened state shown in FIG. 12(d)). The orientation of the information processing apparatus 1 is maintained in the maximum opened state as shown in FIG. 3.

As described above, the outer diameter of the projection 14a, 14b of the hinge portion 14 is greater than the inner diameter of the axis support 15a, 15b of the stand holder 15. Therefore, the hinge portion 14 is easily detached from the stand holder 15. That is, since the projections 14a, 14b of the hinge portion 14 are partially fitted into the axis supports 15a, 15b, if high force is applied to the hinge portion 14, the hinge portion 14 is detached from the stand holder 15. Therefore, when force is further applied in the state shown in FIG. 12(d) in a direction (counterclockwise direction in FIG. 12) in which the stand 10 is opened, force is applied to the projections 14a, 14b of the hinge portion 14. When the force exceeds a certain limit, the entirety of the stand 10 including the stand body 11 is detached from the stand holder 15. Therefore, even when, for example, a user forcibly opens the stand 10 or the information processing apparatus 1 is treaded on when the information processing apparatus 1 is caused to stand by the stand 10, the stand 10 is merely detached from the information processing apparatus 1, and the stand 10 or a portion, of the rear surface of the information processing apparatus 1, at which the stand 10 is fixed is less likely to be damaged.

Thus, the upper end portion of the stand body 11 contacts with the clicker 16 before the stand body 11 enters the maximum opened state shown in FIG. 12(d). By the upper end portion of the stand body 11 contacting with the clicker 16, a user can know a position up to which the stand body 11 can be opened, before the stand body 11 enters the maximum opened state. Furthermore, in the present embodiment, in a case where the stand body 11 is further rotated beyond a position at which the upper end portion of the stand body 11 contacts with the clicker 16, a clicking sound occurs. The clicking sound allows the user to know that the stand body 11 is close to the maximum opened state. That is, in the present embodiment, since a clicking sound occurs before the stand body 11 enters the maximum opened state, the user can easily know a position up to which the stand body 11 can be opened. Furthermore, since the clicker 16 is bent or curved in the front surface direction of the information processing apparatus 1, the clicking sound occurs immediately before the stand body 11 enters the maximum opened state. Thus, the stand 10 and a portion, of the rear surface of the information processing apparatus 1, at which the stand 10 is fixed can be prevented from being damaged, and/or the stand 10 can be prevented from being detached from the information processing apparatus 1.

Furthermore, as shown in FIG. 12(d), when the stand body 11 is in the maximum opened state, the upper end portion of the stand body 11 is positioned closer to the front surface side (side in the z-axis negative direction) of the information processing apparatus 1 than the lower end portion of the clicker 16 is. Even when the stand body 11 is rotated in this state so as to be closed, the upper end portion of the stand body 11 contacts with the lower end portion of the clicker 16, and the clicker 16 stops clockwise rotation of the stand body 11 (rotation in the closing direction).

Thus, when the stand body 11 is in the maximum opened state, the stand body 11 can be inhibited from rotating so as to be closed. Therefore, closing of the stand 10 against the user's intension can be prevented, and the orientation of the information processing apparatus 1 can be stably held. Moreover, since the clicker 16 is bent or curved in the front surface direction of the information processing apparatus 1, a clearance can be reduced when the stand body 11 is in the maximum opened state. That is, a difference between: an angle between the stand body 11 and the housing 2 in the state shown in FIG. 12(d); and an angle between the stand body 11 and the housing 2 in the state shown in FIG. 12(c) can be reduced. Thus, when the information processing apparatus 1 is caused to stand by using the stand body 11, the information processing apparatus 1 is less likely to become unstable. When the stand body 11 is in the maximum opened state, the upper end portion of the stand body 11 and the lower end portion of the clicker 16 may be brought into contact with each other such that no clearance is formed.

Moreover, in the present embodiment, since the hinge portion 14 is formed from a metal, even when opening and closing of the stand 10 is repeated, the projections 14a, 14b of the hinge portion 14 are not easily worn. Therefore, even when opening and closing of the stand 10 is repeated, the projections 14a, 14b of the hinge portion 14 and the axis supports 15a, 15b of the stand holder 15 firmly engage with each other, and the stand body 11 can be prevented from being easily detached or becoming unstable.

Furthermore, in the present embodiment, the clicker 16 is formed from an elastic material (for example, elastomer). Therefore, the clicker 16 is relatively easily deformed, and, also in a case where, when the stand body 11 is opened or closed, the upper end portion of the stand body 11 contacts with the clicker 16, a user is allowed to open or close the stand body 11 with relatively low force.

Furthermore, in the present embodiment, the angled portion is provided at the upper end portion of the stand body 11. Thus, also in a case where the upper end portion of the stand body 11 contacts with the clicker 16, the stand body 11 can be easily rotated beyond the clicker 16. Moreover, since the angled portion comes into surface contact with a part of the stand holder 15, the stand body 11 can be easily supported, and the stand body 11 can be easily maintained in the maximum opened state.

Furthermore, in the present embodiment, the stopper member 12 is provided at the lower end portion of the stand 10. Therefore, friction between the stand 10 and the placement surface can be increased, to prevent the stand 10 from slipping. Moreover, the lower end portion of the stand 10 is curved toward the inner side of the information processing apparatus 1 (see FIG. 3). Therefore, a contact area in which the stopper member 12 contacts with the placement surface can be increased, to prevent the stand 10 from slipping.

Furthermore, in the present embodiment, the stand holder 15, the clicker 16, and the hinge portion 14 are each produced as a separate component, and can be disassembled. Therefore, for example, even in a case where the clicker 16 is worn due to opening and closing of the stand 10 being repeated, the clicker 16 can be changed.

Although the stand 10 for holding the orientation of the information processing apparatus 1 according to the present embodiment is described above, the foregoing description is in all aspects illustrative, and numerous other modifications and variations can be devised.

For example, the material of each of the stand body 11, the stopper member 12, the hinge portion 14, the stand holder 15, the clicker 16, and the like as described above is merely an example, and these components may be formed from other materials. Moreover, the shapes of these components are merely examples, and are not limited to the shapes described above.

For example, in the embodiment described above, the hinge portion 14 has the projections 14a and 14b and is almost U-shaped. The hinge portion may have another shape. For example, the hinge portion may from a linear axis. Moreover, the hinge portion may not be formed from a metal but formed from a resin.

Furthermore, in the embodiment described above, the clicker 16 is bent or curved in the front surface direction of the information processing apparatus 1. However, in another embodiment, the clicker may be linearly formed. Moreover, the clicker may be bent or curved in the rear surface direction of the information processing apparatus 1.

Furthermore, in the embodiment described above, the stand body 11 has the projection portion 11b that projects upward from the rotation axis (the projections 14a and 14b of the hinge portion 14), and the support portion 11c below the rotation axis, and the projection portion 11b comes into contact with the clicker 16. In another embodiment, the shape of the stand body 11 may be any shape when a part of the stand body 11 comes into contact with the clicker 16. For example, a portion, of the stand body 11, which comes into contact with the clicker 16, and a support portion for supporting the information processing apparatus 1 may be provided below the rotation axis.

Furthermore, in another embodiment, the stand body 11 may have the clicker, and a stopping portion that contacts with the clicker when the stand body rotates may be provided. In this case, by the clicker provided in the stand body 11 being deformed, the clicking sound may be caused.

Furthermore, in the embodiment described above, a clicking sound is caused by the clicker 16. However, the clicking sound may not necessarily be caused. For example, when a part of the stand body contacts with the stopping portion before the stand body enters the maximum opened state, and rotation of the stand body in at least one direction is stopped by the stopping portion, a user is allowed to know a position at which the stand body enters the maximum opened state.

Furthermore, in the embodiment described above, as shown in FIG. 12(d), when the stand body 11 is in the maximum opened state, the clicker 16 does not contact with the stand body 11 and a so-called clearance is formed. In another embodiment, when the stand body 11 is in the maximum opened state, the clicker 16 may be in contact with the stand body 11. That is, in the state shown in FIG. 12(d), the clicker 16 may be in contact with the upper end portion of the stand body 11. In this case, the upper end portion of the stand body 11 may be urged by the clicker 16 in the rotating direction (direction in which the stand body 11 shifts from the closed state (first position) to the opened state (second position), i.e., the counterclockwise direction in FIG. 12). By the stand body 11 being urged in the rotating direction by the clicker 16 in the case of the stand body 11 being in the maximum opened state, the stand body 11 can be firmly fixed in the maximum opened state.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A holding structure that holds, when an apparatus is placed on a placement surface, an orientation of the apparatus, the holding structure comprising:
   an axis portion;
   a body portion configured to be rotatable about the axis portion and to hold the orientation of the apparatus; and
   a stopping portion, wherein
   the body portion is rotatable about the axis portion from a first position to a second position,
   a part of the body portion initiates contact with the stopping portion at an intermediate rotational position during rotation of the body portion from the first position to the second position, the intermediate rotational position is distinct from the first position and the second position, and the first position is a closed state and the second position is an open state, the stopping portion allows free rotation of the body portion between the first position and the intermediate position, and the stopping portion stops rotation of the body portion in at least one direction.

2. The holding structure according to claim 1, wherein the axis portion is disposed at an upper portion of the body portion, and the body portion includes
   a support portion that extends from the axis portion to a lower end of the body portion and supports the apparatus, and
   a projection portion that projects from an upper end of the support portion and contacts with the stopping portion when the body portion rotates about the axis portion.

3. The holding structure according to claim 2, wherein an angled portion is provided at an end portion of the projection portion.

4. The holding structure according to claim 1, wherein a lower end portion of the body portion contacts with the placement surface when the apparatus is placed on the placement surface, and an angled portion is provided at an upper end portion, opposite to the lower end portion, of the body portion.

5. The holding structure according to claim 3, wherein an angled surface of the angled portion is oriented toward the apparatus.

6. The holding structure according to claim 1, wherein an upper end portion of the body portion and a lower end portion of the stopping portion are configured to contact with each other, the upper end portion of the body portion moves toward the apparatus when the body portion is rotated from the first position to the second position, and the stopping portion is bent or curved toward the apparatus at least at the lower end portion of the stopping portion.

7. The holding structure according to claim 1, wherein a stopper portion is provided at a lower end portion of the body portion, and the stopper portion is configured to contact with the placement surface when the body portion is rotated to the second position and the apparatus is placed on the placement surface, and the stopper portion is formed from a material having a friction coefficient greater than the lower end portion of the body portion.

8. The holding structure according to claim 1, wherein the body portion holds an orientation of the apparatus with respect to the placement surface when the body portion is rotated about the axis portion into the opened state, and a rear surface of the body portion is substantially level with a rear surface of a housing of the apparatus when the body portion is in the closed state.

9. The holding structure according to claim 1, wherein the body portion forms a part of an outer surface of a housing of the apparatus when the body portion is in the closed state, and a width, in a lateral direction, of the body portion is less than a width, in the lateral direction, of the housing of the apparatus.

10. The holding structure according to claim 1, wherein the axis portion is a metal member.

11. The holding structure according to claim 1, wherein a lower end portion of the body portion is configured to contact with the placement surface when the apparatus is placed on the placement surface, and the lower end portion of the body portion is bent or curved toward the apparatus.

12. The holding structure according to claim 1, comprising a holder configured to engage with the stopping portion such that the holder and the stopping portion can separate from each other, and the stopping portion is engaged with the holder and fixed to the apparatus.

13. The holding structure according to claim 1, wherein the holding structure is provided in the apparatus.

14. The holding structure according to claim 13, wherein the body portion is configured to hold an orientation of the apparatus when the body portion is in the opened state, and at least one projection that is configured to engage with an engagement portion provided in the apparatus when the body portion is in the closed state is provided on a side of the body portion that faces the apparatus.

15. The holding structure according to claim 1, comprising an axis support configured to support the axis portion such that the axis portion is rotatable, wherein the axis portion is fixed to the body portion, and a diameter of the axis support is less than a diameter of the axis portion.

16. An apparatus comprising a holding structure for holding an orientation of the apparatus when the apparatus is placed on a placement surface, the apparatus comprising:
   an axis portion;
   a body portion configured to be rotatable about the axis portion and to hold the orientation of the apparatus; and
   a stopping portion, wherein
   the body portion is rotatable about the axis portion from a first position to a second position,
   a part of the body portion initiates contact with the stopping portion at an intermediate rotational position during rotation of the body portion from the first position to the second position,
   the intermediate rotational position is distinct from the first position and the second position,
   the first position is a closed state and the second position is an open state,
   the stopping portion allows free rotation of the body portion between the first portion and the intermediate position, and
   the stopping portion stops rotation of the body portion in at least one direction.

17. A holding structure that is configured to support an apparatus that is placed on a placement surface in a predetermined orientation, the holding structure comprising:
   a body including a retaining structure adjacent a first end, the retaining structure including
      a first central portion that is straight except adjacent a screw hole that is laterally centered on the first central portion,
      two first lateral straight portions that are at opposed ends of and perpendicular to the first central portion and extending away from the first central portion towards the first end, and
      two first curved portions that connect the two first lateral straight portions to the first central portion; and a hinge structure comprising
a second central portion that is straight,
two second lateral straight portions that are at opposed ends of the second central portion and that are perpendicular to the second central portion and that extend away from the second central portion towards the first end,
two second curved portions that connect the two second lateral straight portions to the second central portion, and
a first projection and a second projection extending from respective ones of the two second lateral straight portions and extending along an axis that is parallel to the second central portion, the first projection and the second projection projecting outward from the hinge structure in opposite directions, wherein the retaining structure and the hinge structure are each substantially U-shaped and the retaining structure is nested within the hinge structure.

18. The holding structure according to claim 17, further comprising a screw with a head, wherein the screw is retained in the screw hole, the head retains the hinge structure by covering part of the second central portion of the hinge structure, and a center of the head is on an opposite side of the first central portion from the second central portion.

19. The holding structure according to claim 17, wherein the body further includes a second end opposite the first end, the second end is curved and includes two projections projecting from a radially interior side of the curve, and the projections are configured to be received in respective recesses of the apparatus to retain the holding structure against the apparatus in a closed state.

20. The holding structure according to claim 17, wherein the first end includes a surface that is angled with respect to an overall length of the holding structure such that when the holding structure is rotated from a first position to a second position about the axis, the surface has an orientation in the second position that is orientated toward the apparatus.

21. A holding structure that holds, when an apparatus is placed on a placement surface, an orientation of the apparatus, the holding structure comprising:
an axis portion; and
a body portion configured to be rotatable about the axis portion and to hold the orientation of the apparatus; wherein
the axis portion is fixed to the body portion so that the axis portion does not rotate relative to the body portion,
the body portion is rotatable about the axis portion from a first position to a second position,
a first part of the body portion is configured to contact with a stopping portion of the apparatus at a position during rotation of the body portion from the first position to the second position, the stopping portion being configured to stop rotation of the body portion in at least one direction,
a second part of the body portion distal to the first part is configured to contact with the placement surface when the apparatus is placed on the placement surface and the holding structure is installed on the apparatus in an open position, and the second part of the body portion is bent or curved toward the apparatus when the holding structure is installed on the apparatus in a closed position.

22. The holding structure according to claim 21, wherein the axis portion is disposed at an upper portion of the body portion, and
the body portion includes
a support portion that extends from the axis portion to a lower end of the body portion and is configured to support the apparatus, and
the first part of the body portion is a projection portion that projects from an upper end of the support portion.

23. The holding structure according to claim 22, wherein an angled portion is provided at an end portion of the projection portion.

24. The holding structure according to claim 21, wherein a lower end portion of the body portion contacts with the placement surface when the apparatus is placed on the placement surface, and
an angled portion is provided at an upper end portion, opposite to the lower end portion, of the body portion.

25. The holding structure according to claim 23, wherein an angled surface of the angled portion is oriented toward the apparatus.

26. The holding structure according to claim 21, wherein a stopper portion is provided at a lower end portion of the body portion, and
the stopper portion is configured to contact with the placement surface when the body portion is rotated to the second position and the apparatus is placed on the placement surface, and the stopper portion is formed from a material having a friction coefficient greater than the lower end portion of the body portion.

27. The holding structure according to claim 21, wherein the body portion is in a closed state when the body portion is at the first position,
the body portion is in an opened state when the body portion is at the second position,
the body portion holds an orientation of the apparatus with respect to the placement surface when the body portion is rotated about the axis portion into the opened state, and
a rear surface of the body portion is substantially level with a rear surface of a housing of the apparatus when the body portion is in the closed state.

28. The holding structure according to claim 21, wherein the body portion is in a closed state when the body portion is at the first position,
the body portion is in an opened state when the body portion is at the second position,
the body portion forms a part of an outer surface of a housing of the apparatus when the body portion is in the closed state, and
a width, in a lateral direction, of the body portion is less than a width, in the lateral direction, of the housing of the apparatus.

29. The holding structure according to claim 21, wherein the axis portion is a metal member.

* * * * *